US011751035B2

(12) United States Patent
Dodman (10) Patent No.: US 11,751,035 B2
(45) Date of Patent: Sep. 5, 2023

(54) EXTERIOR SPEECH RECOGNITION CALLING FOR EMERGENCY SERVICES

(71) Applicant: Continental Automotive Systems, Inc., Auburn Hills, MI (US)

(72) Inventor: Jacob Dodman, Utica, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 149 days.

(21) Appl. No.: 17/105,035

(22) Filed: Nov. 25, 2020

(65) Prior Publication Data

US 2022/0167139 A1    May 26, 2022

(51) Int. Cl.
*H04W 4/90* (2018.01)
*H04W 4/40* (2018.01)
*H04M 1/72421* (2021.01)
*H04M 1/72454* (2021.01)
*G01S 13/02* (2006.01)
*G01S 13/04* (2006.01)
*G10L 15/08* (2006.01)
*G10L 15/22* (2006.01)

(52) U.S. Cl.
CPC .......... *H04W 4/90* (2018.02); *G01S 13/0209* (2013.01); *G01S 13/04* (2013.01); *G10L 15/08* (2013.01); *G10L 15/22* (2013.01); *H04M 1/72421* (2021.01); *H04M 1/72454* (2021.01); *H04W 4/40* (2018.02); *G10L 2015/088* (2013.01); *G10L 2015/223* (2013.01); *H04M 2201/40* (2013.01)

(58) Field of Classification Search
CPC .............. H04W 4/40; H04M 1/72421; H04M 1/72454; G01S 13/0209; G01S 13/04; G10L 15/08; G10L 15/22
USPC ........................................................ 455/404.1
See application file for complete search history.

(56) References Cited

U.S. PATENT DOCUMENTS

| 5,706,399 | A  | 1/1998 | Bareis |
| 6,310,543 | B1 | 10/2001 | Yoshioka et al. |
| 6,498,970 | B2 | 12/2002 | Colmenarez et al. |

(Continued)

FOREIGN PATENT DOCUMENTS

| CN | 102572155 A | 7/2012 |
| DE | 10006923 A1 | 9/2001 |

(Continued)

OTHER PUBLICATIONS

Emmanuele Principi et al. "An integrated system for voice command recognition and emergency detection based on audio signals", Expert Systems with Applications, Feb. 14, 2015, Springer.

(Continued)

*Primary Examiner* — Maria El-Zoobi (57) ABSTRACT

One or more presence sensors of a vehicle are used to detect the presence of one or more people outside the vehicle. When the presence of the one or more people outside the vehicle is detected, one or more external microphones of the vehicle are used to capture any speech by people. A speech recognizer of the vehicle is used to determine whether the captured speech includes a verbal request for emergency services. And, upon determining that the captured speech includes the verbal request for emergency services, a network access device of the vehicle is used to automatically request emergency services.

18 Claims, 5 Drawing Sheets

(56) References Cited

U.S. PATENT DOCUMENTS

| | | | |
|---|---|---|---|
| 9,300,784 B2 | 3/2016 | Roberts et al. | |
| 10,492,054 B2 | 11/2019 | Gray | |
| 2003/0231550 A1 | 12/2003 | Macfarlane | |
| 2005/0134504 A1 | 6/2005 | Harwood et al. | |
| 2009/0309713 A1* | 12/2009 | Baruco | B60R 25/257 340/12.3 |
| 2010/0284382 A1 | 11/2010 | Staehlin et al. | |
| 2011/0210835 A1 | 10/2011 | Kondo | |
| 2015/0302207 A1* | 10/2015 | Sprenger | G06F 21/55 726/26 |
| 2017/0030133 A1 | 2/2017 | Elie et al. | |
| 2017/0136973 A1 | 5/2017 | Lee | |
| 2017/0323635 A1* | 11/2017 | Zhao | G06F 3/167 |
| 2018/0325470 A1* | 11/2018 | Fountaine | G08B 21/0469 |
| 2020/0047687 A1* | 2/2020 | Camhi | G10L 15/22 |
| 2020/0062175 A1* | 2/2020 | Lee | B60Q 1/52 |
| 2020/0193994 A1* | 6/2020 | Ahn | G06F 3/167 |

FOREIGN PATENT DOCUMENTS

| | | |
|---|---|---|
| EP | 2186078 B1 | 5/2010 |
| IN | 2015MU04104 A | 11/2017 |
| JP | 5327252 B2 | 10/2011 |
| JP | 2019183504 A | 10/2019 |
| KR | 20160056054 A | 5/2016 |
| KR | 101807213 B1 | 12/2017 |
| WO | 2018150371 A1 | 8/2018 |

OTHER PUBLICATIONS

Yilin Zhao "Telematics: Safe and Fun Driving", Intelligent Transportation Systems, 2002, IEEE.

"Bosch enables emergency call outside the car", https://www.sfara.com/2019/02/21/bosch-enables-emergency-call-outside-the-car, Feb. 21, 2019, Sfara, Bosch Service Solutions GmbH.

International Search Report and Written Opinion dated Mar. 11, 2022 from corresponding International patent application No. PCT/US2021/060188.

* cited by examiner

EXTERIOR SPEECH RECOGNITION CALLING FOR EMERGENCY SERVICES

BACKGROUND

Embodiments of the invention relate generally to automotive telematics systems and more particularly to providing emergency calls upon detecting a person outside of an automotive vehicle verbally requesting help from emergency services.

Using telecommunication systems to automatically perform emergency calls in certain situations is known. With some automotive telematics systems, emergency services can be automatically called by the system immediately following a dangerous car accident in which the airbags deploy. Emergency calls of this type are typically automatically made by an embedded cellular phone in the vehicle and are placed to an emergency call center. Such a call center may also be manually dialed by the occupants of the vehicle by pressing a button on the rearview-mirror assembly, for example.

But users of an automotive telematics system are typically only able to cause the embedded cellular phone of the vehicle to make a call to a call center while the users are located inside the vehicle. Stated differently, the user cannot use the emergency calling services unless they are already inside the vehicle.

As such, being able to cause a vehicle's embedded cellular phone (or other wireless communication device of the vehicle) to place a call for emergency services, while a person is outside the vehicle would advance the state of the art. This ability to make an emergency phone call in a hands-free manner from outside a vehicle provides increased safety in situations in which a person is a potential robbery victim while they are near, but outside of, a vehicle.

BRIEF SUMMARY

In accordance with embodiments of the invention, one or more presence sensors of a vehicle are used to detect the presence of one or more people outside the vehicle. When the presence of the one or more people outside the vehicle is detected, one or more external microphones of the vehicle are used to capture any speech by people. A speech recognizer of the vehicle is used to determine whether the captured speech includes a verbal request for emergency services. And, upon determining that the captured speech includes the verbal request for emergency services, a network access device of the vehicle is used to automatically request emergency services.

DETAILED DESCRIPTION

One or more microphones mounted outside a vehicle are used with a speech recognizer to detect one or more people speaking and to recognize a request for emergency services. For example, a request for emergency services may be made simply by a person saying "call 911", "HELP", or any other predetermined emergency code word or phrase.

To preserve power consumption of the vehicle's battery, the one or more microphones outside the vehicle may be paired with a keyless vehicle access and start system, which, as is known in the art, some of which operate in a hands-free manner and/or may be activated by an unlock button on a key fob. Embodiments of the invention also enable hands-free access and smart access applications based on speech recognition. As is known in the art, vehicle access systems allows the vehicle "key" (or fob) to work without being held in the driver's hand for both vehicle access and turning on the ignition of the vehicle.

In operation, one or more presence sensors, such as one or more radar sensors, recognize a nearby person and automatically activate the speech recognizer which "listens" for a request for emergency services from anyone, such as "HELP" or "call 911".

Unlike a conventional car alarm system, embodiments of the invention protect people near a vehicle. Using a sensor such as radar, the system "wakes-up" when a person is identified by the sensor, and the systems then "listens for" certain phrases, which, when said by a person nearby, will trigger an automatic call to emergency services.

Figure 1:
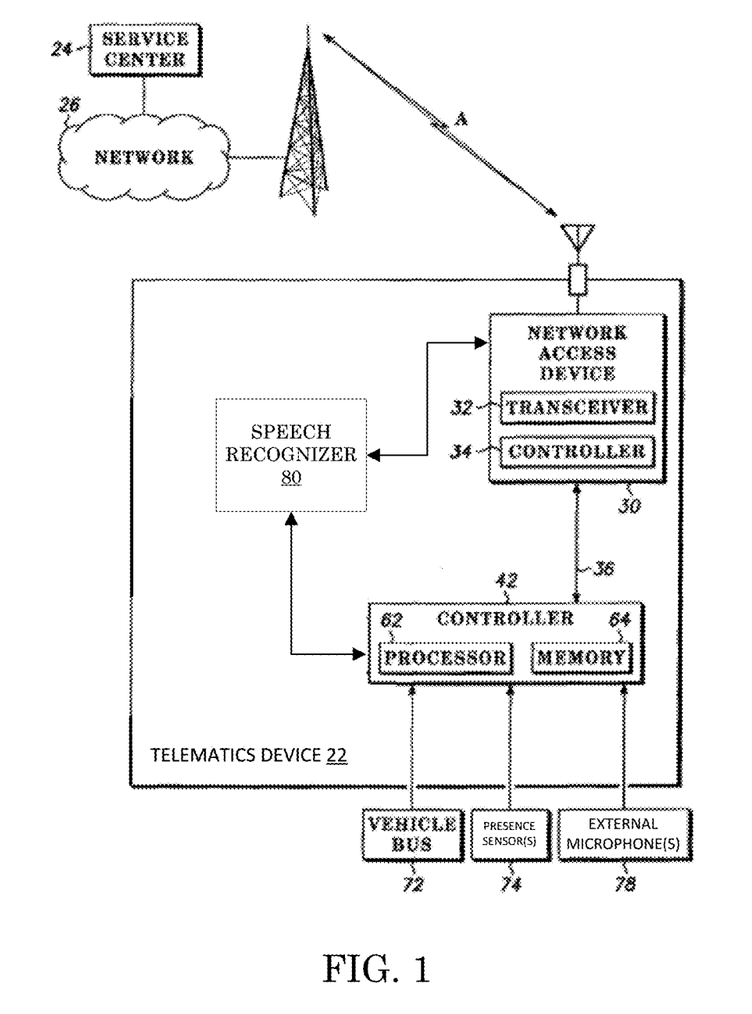
FIG. 1 illustrates a block diagram of a communication system in accordance with embodiments of the invention.

FIG. 1 illustrates a block diagram of a communication system in accordance with embodiments of the invention. Generally, the communication system includes an embedded automotive telematics device 22 and a service center 24. Although only one telematics device 22 and service center 24 are shown, the invention may include any number of these elements interoperating with each other. Instead of, or in addition to a telematics device, a vehicle may also include a V2X transceiver, which also may be used for sending emergency messages from a vehicle. Emergency services may be requested via a voice call and/or a data message.

An intermediate network 26 may be used for wireless communications between the telematics device 22 and the service center 24. For instance, the network 26 could be one of several standard cellular communication networks, a satellite-based network, a public switched telecommunication network (PSTN), the Internet, an integrated services digital network (ISDN), and/or other suitable type of communication network.

A service provider may operate the service center 24 to provide Telematics applications and services to the telematics device 22. For instance, the service center 24 may contain operators, content servers, and content databases. The content servers for Telematics applications and services may include traffic servers, map servers, user profile servers, location information servers, and the like. The content databases for Telematics applications and services may include location information, user profiles, traffic content, map content, point-of-interest content, usage history, and the like.

In one embodiment, the telematics device 22 may generally comprise a network access device (NAD) 30 and a controller 42. The network access device 30 includes at least a transceiver 32, but may also include a controller 34.

In FIG. 1, the telematics device 22 is shown as a single unit having a serial connection 36 between the network access device 30 and the controller 42. Although shown as a single unit in FIG. 1, the network access device 30 may be a separate unit from the telematics device 22. In particular, the network access device 30 may be an embedded cellular telephone within the automotive vehicle.

The transceiver 32 in the network access device 30 is used for transmitting uplink communications and receiving downlink communication to and from the network 26 and service center 24 over wireless communication link A. The wireless communication link A may use a wireless protocol such as a standard cellular network protocol such as Advanced Mobile Phone Service (AMPS), Global System for Mobile Communications (GSM), and any other suitable cellular network protocol. To transmit data in the cellular environment, different types of standard bearer services exist including, but not limited to, general packet radio service (GPRS), short message service (SMS), circuit switched data service (CSD), and high-speed circuit switched data service (HSCSD). In another embodiment, standard transmission control protocol/internet protocol (TCP/IP) may also be used as well as satellite communications. In a further embodiment, the transceiver 32 may be enabled using other wireless technologies such as Bluetooth® technology.

The controller 42 in the telematics device 22 has a processor 62 for processing algorithms and other data stored in memory 64. The memory 64 may store operating software and variables that may be used in accordance with the present invention. The memory 64 could also store tables, formulas and other data for making certain determinations in accordance with embodiments of the invention.

Additionally, the memory 64 may also contain programs and algorithms to monitor and control operation of the speech recognizer 80 and the network access device.

The controller 42 is also connected to a vehicle bus 72 and to one or more microphones 78 that are externally mounted to the vehicle. The controller 42 may also be connected to a positioning unit (not shown). The positioning unit could be a system that determines the geographic location of the telematics device 22 in the vehicle such as a global positioning system (GPS), a dead-reckoning system, and the like.

Presence sensors 74 may be one or more radar sensors or any other suitable type of sensor for detecting the presence of one or more persons, including, but not limited to, acoustic and ultrasonic transducers, for example.

In some embodiments, the one or more presence sensors may be one or more radar sensors that are powered when the vehicle's ignition is off. In some embodiments, the one or more presence sensors may include one or more UWB (Ultra Wide Band) impulse radar sensors, which consume less power than ordinary radar sensors.

The presence sensors 74 may be in addition to any other sensors on the vehicle, such as any cameras, radar, and other sensors used for other purposes, such as intelligent cruise control and/or pedestrian detection while the vehicle is being driven. In some embodiments, the presence sensors 74 may be existing radar, ultrasonic, or other sensors of the vehicle, which are suitable for detecting human presence.

A wide variety of sensors could be used for detecting the possible presence of a human. Acoustic sensors or surface acoustic wave sensors could be used to detect sudden changes in nearby sound to wakeup the system. Cameras could also be used to detect humans and wakeup the system, however, this might consume a large amount of power. Even lidar or other motion sensing devices such as passive infrared sensors could be used as well to wakeup the system.

Figure 2:
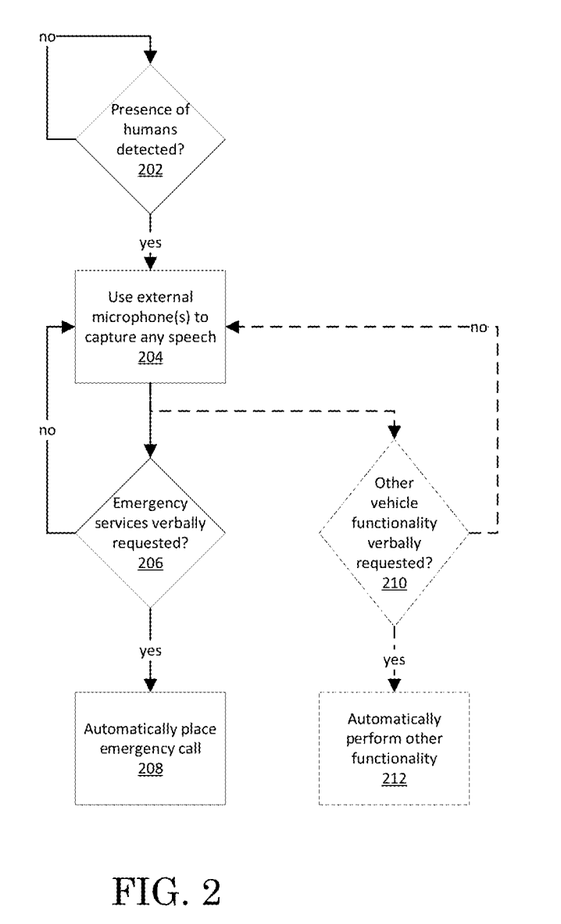
FIG. 2 is a flowchart showing steps in accordance with embodiments of the invention.

FIG. 2 is a flowchart showing steps in accordance with embodiments of the invention. At step 202, a determination is made regarding the presence of one or more humans. If the presence of humans is not detected, the process continues to check for the presence of any humans. Once a human is detected, at step 204, any speech by the one or more humans is captured by the one or more external microphones 78, which are mounted to and/or directed toward the outside of the vehicle such that they are positioned and oriented to capture sounds originating from outside the vehicle.

The speech recognizer 80 performs speech recognition on the audio captured by the one or more external microphones 78. Speech recognizer uses algorithms, which are well known in the art, to analyze the captured audio in order to determine whether the one or more people who are present have requested emergency services. For example, the speech recognizer may listen for phrases, including, but not limited to, "help", "call 911", and any other predetermined emergency-situation code words or phrases, which may be programmed by a user into the speech recognizer in advance.

As is known in the art, a person speaking creates vibrations in the air. Speech recognition typically involves analog-to-digital conversion of an analog wave into digital data. To do this, the sound is sampled, or digitized, by taking precise measurements of the wave at frequent intervals. The speech recognizer may filter the digitized sound to remove unwanted noise, and may separate the sound into different bands of frequency. The signal is divided into small segments that are then matched to known phonemes in one or more appropriate languages. The speech recognizer then examines phonemes in the context of the other phonemes around them, runs the contextual phoneme plot through a complex statistical model, and compares them to a large library of known words, phrases, and sentences. The speech recognizer then determines whether the one or more people were verbally requesting emergency services.

At 206, the speech recognizer determines whether anyone near the vehicle (e.g., within the range that the human voice carries, namely, as close as inches up to as far away as 180 meters) has verbally requested emergency services. If the speech recognizer determines that nobody near the vehicle has requested emergency services, the speech recognizer continues using the external microphones to capture any speech and determining whether anyone near the vehicle has verbally requested emergency services.

If the speech recognizer determines that the one or more people near the vehicle have verbally requested emergency services, then, at 208, the speech recognizer causes an emergency call to be placed to service center 24, or to 911, or in any other suitable way, such as by V2X (vehicle to everything) communication.

At 210, the speech recognizer optionally determines whether anyone near the vehicle (e.g., within the range that the human voice carries, namely, as close as inches up to as far away as 180 meters) has verbally requested a vehicle functionality other than emergency services. If the speech recognizer determines that nobody near the vehicle has requested such a vehicle functionality, the speech recognizer continues using the external microphones to capture any speech and determining whether anyone near the vehicle has verbally requested such a functionality.

If the speech recognizer determines that the one or more people near the vehicle have verbally requested a vehicle functionality other than emergency services, then, at 212, the speech recognizer causes the vehicle functionality to be performed. In an embodiment, the speech recognizer communicates to the controller that the verbally requested vehicle functionality should be performed, and the controller causes the functionality to be performed by sending a message via the data bus in a manner that is well known in the art. The verbally requested vehicle functionality may include, but is not limited to: opening the vehicle's trunk, locking the vehicle, unlocking the vehicle, starting the vehicle, and turning on the vehicle's headlights.

Figure 3:
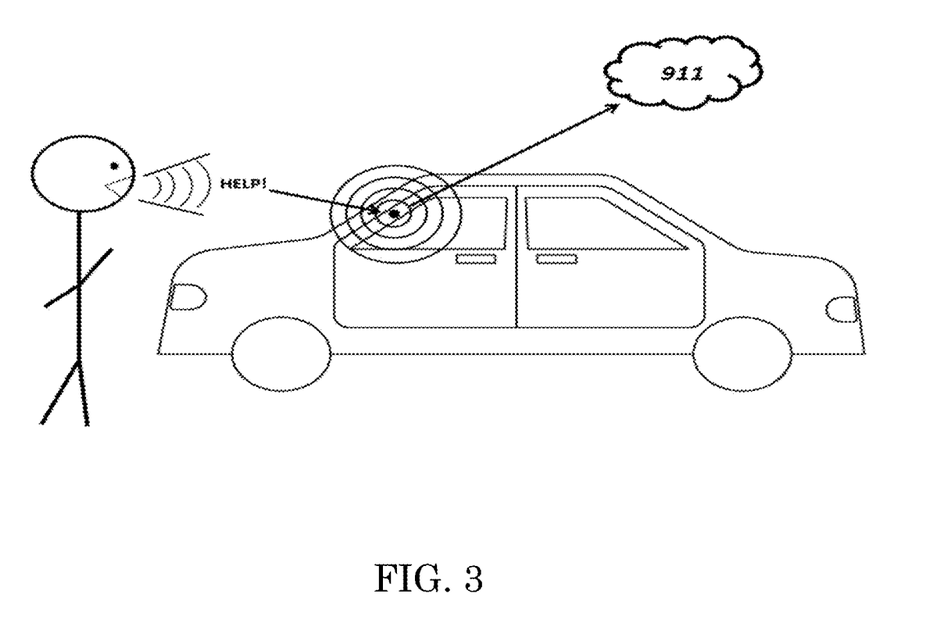
FIG. 3 depicts a person verbally requesting emergency services from outside an automotive vehicle in accordance with embodiments of the invention.

FIG. 3 depicts a person verbally requesting emergency services from outside an automotive vehicle, and the vehicle automatically recognizing the verbal request for emergency services and automatically making a call for emergency services in response to the verbal request.

Figure 4:
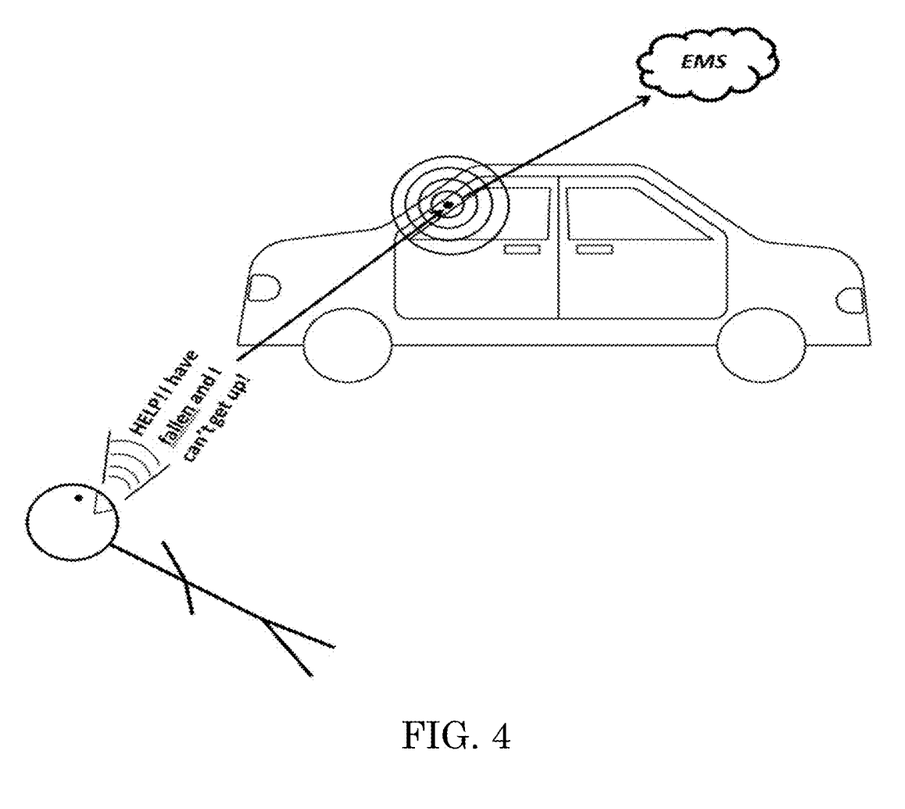
FIG. 4 depicts a person verbally requesting emergency services from outside an automotive vehicle after having fallen down and not being able to get up in accordance with embodiments of the invention.

FIG. 4 depicts a person verbally requesting emergency services from outside an automotive vehicle after having fallen down and not being able to get up, and the vehicle automatically recognizing the verbal request for emergency services and automatically making a call for emergency services in response to the verbal request.

Figure 5:
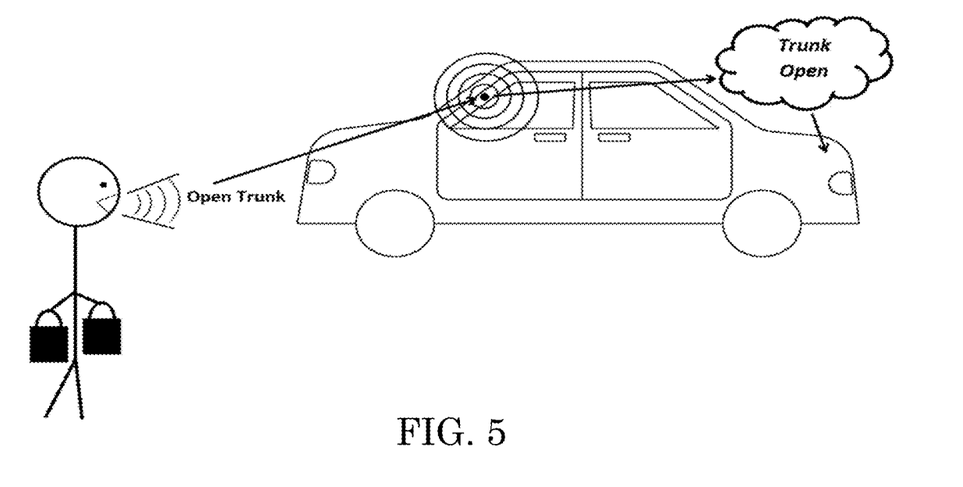
FIG. 5 depicts a person outside a vehicle verbally requesting that the vehicle open its trunk in accordance with embodiments of the invention.

FIG. 5 depicts a person outside a vehicle verbally requesting that the vehicle open its trunk and the vehicle automatically recognizing the verbal request and automatically opening the trunk, a sliding door, or a tailgate of the vehicle such that the person can put the packages directly into the vehicle without having to put the packages down in order to use their hands to open the trunk by, for example, pressing a key-fob button. Similarly, a vehicle user may verbally request other vehicle functionalities, by saying words or phrases, including, but not limited to: "open trunk", "lock", "unlock", "start", "turn on headlights", and the like.

As described in more detail above, embodiments of the invention provide enhanced safety and security when people are near a vehicle and verbally indicate that they need help. For example, when an assailant is located nearby a vehicle and waits for a victim to approach their vehicle to take out their key fob. In such a situation, the assailant may remove the vehicle owner's keys from the owner's possession and steal the vehicle. In situations of this type, the assailant may also take away the vehicle owner's cellular phone before taking away the owner's keys, thereby preventing the vehicle owner from promptly contacting the police.

In accordance with embodiments of the invention, the vehicle owner, or anyone else, could say "help", or "call 911", or say some other emergency word or phrase so that the vehicle would recognize the request for help and alert emergency services.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method comprising:
   using one or more presence sensors of a vehicle to detect the presence of one or more people outside the vehicle, wherein the one or more presence sensors include one or more radar sensors;
   when the presence of the one or more people outside the vehicle is detected, using one or more external microphones of the vehicle to capture any speech by the one or more people outside the vehicle;
   using a speech recognizer of the vehicle to determine whether the captured speech from outside the vehicle includes a verbal request for emergency services, wherein the verbal request for emergency services includes: "call 911"; and
   upon determining that the captured speech from outside the vehicle includes the verbal request for emergency services, using a network access device of the vehicle to automatically request emergency services.

2. The method of claim 1, wherein the one or more presence sensors include one or more Ultra Wide Band impulse radar sensors.

3. The method of claim 2, wherein the verbal request for emergency services includes "help".

4. The method of claim 1, wherein the verbal request for emergency services includes at least one of a predefined code word and a predefined code phrase.

5. The method of claim 1, wherein the emergency services are requested via a cellular telephone call.

6. The method of claim 1, wherein the emergency services are requested via a data message.

7. The method of claim 2, wherein the emergency services are requested via a V2X (Vehicle to Everything) communication.

8. The method of claim 1, further comprising:
   using a speech recognizer of the vehicle to determine whether the captured speech includes a verbal request for a vehicle functionality other than calling emergency services; and
   upon determining that the captured speech includes the verbal request for a vehicle functionality other than calling emergency services, performing the requested vehicle functionality.

9. The method of claim 8, wherein the requested vehicle functionality is selected from the group consisting of: opening the vehicle's trunk, locking the vehicle, unlocking the vehicle, starting the vehicle, and turning on the vehicle's headlights.

10. An apparatus comprising:
    one or more presence sensors of a vehicle configured to detect the presence of one or more people outside the vehicle, wherein the one or more presence sensors include one or more radar sensors;
    one or more external microphones of the vehicle configured to capture any speech originating from outside the vehicle when the presence of the one or more people outside the vehicle is detected;
    a speech recognizer of the vehicle configured to determine whether the captured speech from outside the vehicle includes a verbal request for emergency services, wherein the verbal request for emergency service includes: "call 911"; and
    a network access device of the vehicle configured to automatically request emergency services when the speech recognizer determines that the captured speech from the outside the vehicle includes the verbal request for emergency services.

11. The apparatus of claim 10, wherein the one or more presence sensors include one or more Ultra Wide Band impulse radar sensors.

12. The apparatus of claim 11, wherein the verbal request for emergency services includes "help".

13. The apparatus of claim 10, wherein the verbal request for emergency services includes at least one of a predefined code word and a predefined code phrase.

14. The apparatus of claim 10, wherein the emergency services are requested via a cellular telephone call.

15. The apparatus of claim 10, wherein the emergency services are requested via a data message.

16. The apparatus of claim 11, wherein the emergency services are requested via a V2X (Vehicle to Everything) communication.

17. The apparatus of claim 10, further comprising:
  a speech recognizer of the vehicle configured to determine whether the captured speech from outside the vehicle includes a verbal request for a vehicle functionality other than calling emergency services; and
  a controller of the vehicle configured to automatically cause a vehicle functionality to be performed when the speech recognizer determines that the captured speech includes the verbal request for the vehicle functionality other than calling emergency services to be performed.

18. The apparatus of claim 17, wherein the requested vehicle functionality is selected from the group consisting of: opening the vehicle's trunk, locking the vehicle, unlocking the vehicle, starting the vehicle, and turning on the vehicle's headlights.

\* \* \* \* \*